(12) United States Patent
Wang et al.

(10) Patent No.: US 7,876,377 B2
(45) Date of Patent: Jan. 25, 2011

(54) DIGITAL CAMERA WITH LEFT- OR RIGHT-HANDED OPERATION

(75) Inventors: Wei-Jen Wang, Taipei Hsien (TW); Shih-Pao Cheng, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 400 days.

(21) Appl. No.: 12/108,050

(22) Filed: Apr. 23, 2008

(65) Prior Publication Data

US 2009/0096919 A1    Apr. 16, 2009

(30) Foreign Application Priority Data

Oct. 16, 2007    (CN) .................. 2007 1 0202071

(51) Int. Cl.
H04N 5/225    (2006.01)
H04N 5/222    (2006.01)
G03B 17/38    (2006.01)

(52) U.S. Cl. ................... 348/373; 348/333.06; 396/502

(58) Field of Classification Search ............ 348/333.06, 348/371, 373, 376; 396/502, 540, 541

See application file for complete search history.

(56) References Cited

U.S. PATENT DOCUMENTS 5,408,287 A * 4/1995 Winegarden et al. ........ 396/502

| 7,137,703 B2 | 11/2006 | Weigel |
| 7,151,571 B2 * | 12/2006 | Yip ............................. 348/373 |
| 2006/0022953 A1 | 2/2006 | Franttila |
| 2006/0072033 A1 * | 4/2006 | Oran ........................... 348/376 |
| 2007/0024736 A1 * | 2/2007 | Matsuda et al. .......... 348/333.12 |

FOREIGN PATENT DOCUMENTS

| JP | 2004-29158 A | 1/2004 |
| JP | 2004-340991 A | 12/2004 |
| JP | 2007-33996 A | 2/2007 |

* cited by examiner

*Primary Examiner*—Kelly L Jerabek
(74) *Attorney, Agent, or Firm*—Andrew C. Cheng

(57) ABSTRACT

A digital camera having a housing and a lens assembly receiving in the housing, includes a touch screen, a right shutter button, a left shutter button, and a selection switch. The right shutter button is configured for right-handed activation of a shutter function of the lens assembly of the digital camera. The left shutter button is configured for a left hand to turn on the lens assembly of the digital camera. The selection switch is electronically connected to the left, right shutter buttons and the touch screen. The selection switch is configured for selecting and activating one of the left, right shutter buttons to turn on the lens assembly of the digital camera. The selection is also configured for changing a relative position of the image-displaying area and the virtual button area in response to the left shutter button and the right shutter button that is activated.

9 Claims, 7 Drawing Sheets

DIGITAL CAMERA WITH LEFT- OR RIGHT-HANDED OPERATION

RELATED FIELD

The present invention relates to a digital cameral, and, in particular, to a digital camera having two shutter buttons convenient for left- or right-handed operation.

BACKGROUND

Conventionally, many digital cameras have a shutter button for right-handed operation of the digital camera, such as turning on a lens assembly to expose an image capturing device, such as a CCD image sensor, a CMOS image sensor or the like. However, operation of the digital camera is inconvenient for a left-handed person.

It is desired to provide a digital camera having two shutter buttons, which can overcome the above-described deficiency.

SUMMARY

In accordance with an embodiment of the present invention, a digital camera has a housing and a lens assembly in the housing, and also includes a touch screen, a right shutter button, a left shutter button, and a selection switch. The touch screen is in the housing and includes an image-displaying area and a virtual button area having a plurality of virtual buttons for controlling the digital camera. The right shutter button is configured for right-handed activation of a shutter function of the lens assembly of the digital camera. The left shutter button is configured for left-handed activation of the shutter function of the lens assembly of the digital camera. The selection switch is electronically connected to the left and right shutter buttons and the touch screen. The selection switch is configured for selecting and activating one of the left and right shutter buttons. The selection switch is also configured for changing a relative position of the image-displaying area and the virtual button area in response to the selection of the left shutter button or the right shutter button for activation.

Other novel features and advantages will become more apparent from the following detailed description when taken in conjunction with the accompanying drawings.

BRIEF DESCRIPTION OF THE DRAWINGS

The present invention is described in detail hereinafter, by way of example and description of preferred and exemplary embodiments thereof and with reference to the accompanying drawings, in which.

DETAILED DESCRIPTION OF EXEMPLARY EMBODIMENTS

Figure 1:
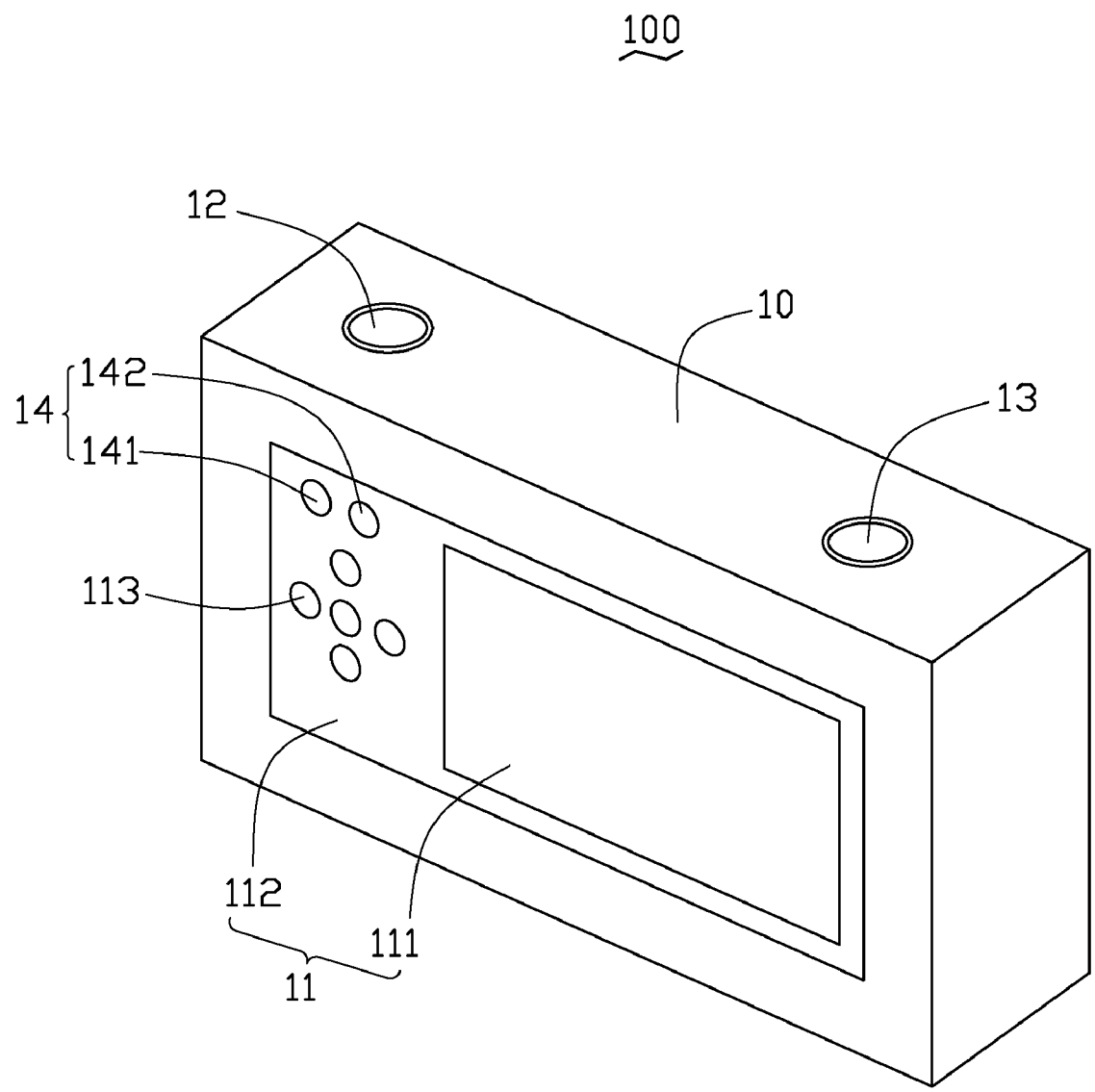
FIG. 1 is an isometric view of a digital camera when a left shutter button is activated according to a first embodiment.
Figure 2:
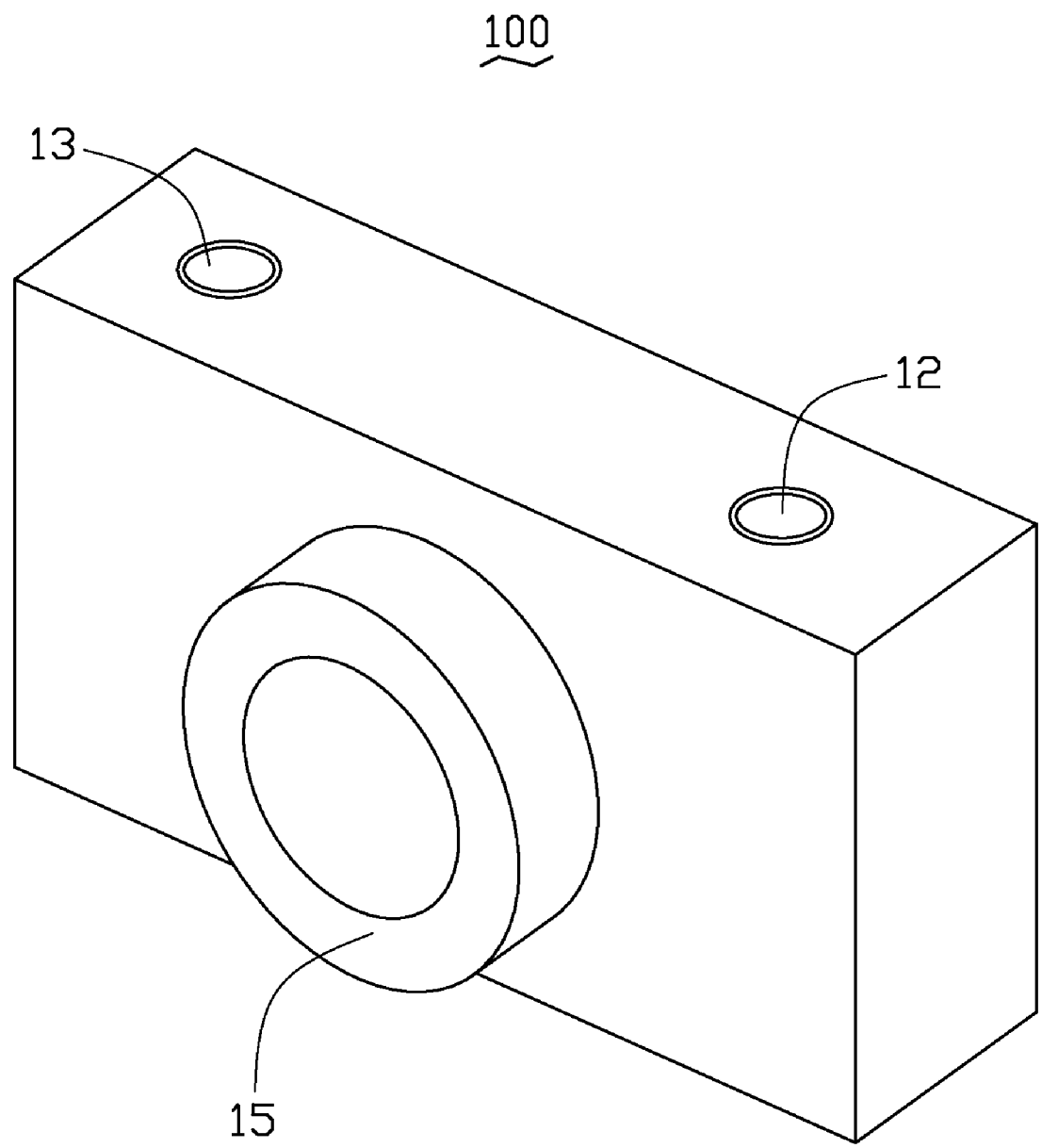
FIG. 2 is another isometric view of the digital camera of FIG. 1

A detailed explanation of a digital camera having two shutter buttons according to an exemplary embodiment of the present invention will now be made with reference to the drawings attached hereto.

Referring to FIGS. 1-4, a digital camera 100 according to a first embodiment of the present invention is shown. The digital camera 100 includes a housing 10, a touch screen 11 received in the housing 10, a left shutter button 12 disposed on the housing 10, a right shutter button 13 disposed on the housing 10, a selection switch 14, and a lens assembly 15 held in the housing 10.

The housing 10 is configured for holding and protecting all elements, such as, the touch screen 11, the lens assembly 15, and so on therein.

Figure 3:
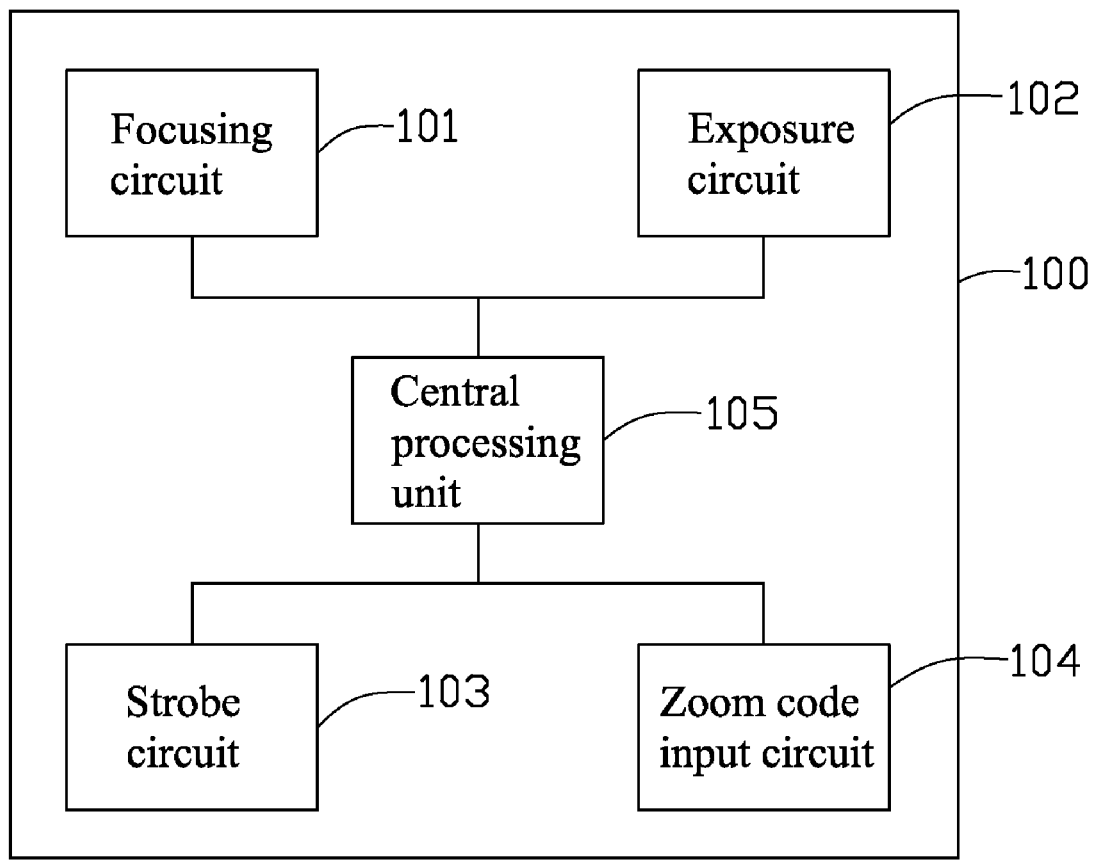
FIG. 3 is a block diagram of circuitry of the digital camera of FIG. 1.

It should be noted that the digital camera 100, as shown in FIG. 3, also includes a focusing circuit 101, an exposure circuit 102, a strobe circuit 103, a zoom code input circuit 104, etc., as are commonly found in digital cameras. Furthermore, the digital camera 100 includes a central processing unit (CPU) 105. The CPU 105 is electronically connected to the focusing circuit 101, the exposure circuit 102, the strobe circuit 103, and the zoom code input circuit 104, and performs general handling of various operations of the digital camera 100, including a photometering operation, an automatic focusing (AF) operation, an automatic exposure operation, a film winding and rewinding operation, etc. In the exemplary embodiment, the CPU 105 carries out a predetermined operation in response to usage of the left shutter button 12, the right shutter button 13, and the selection switch 14.

Figure 4:
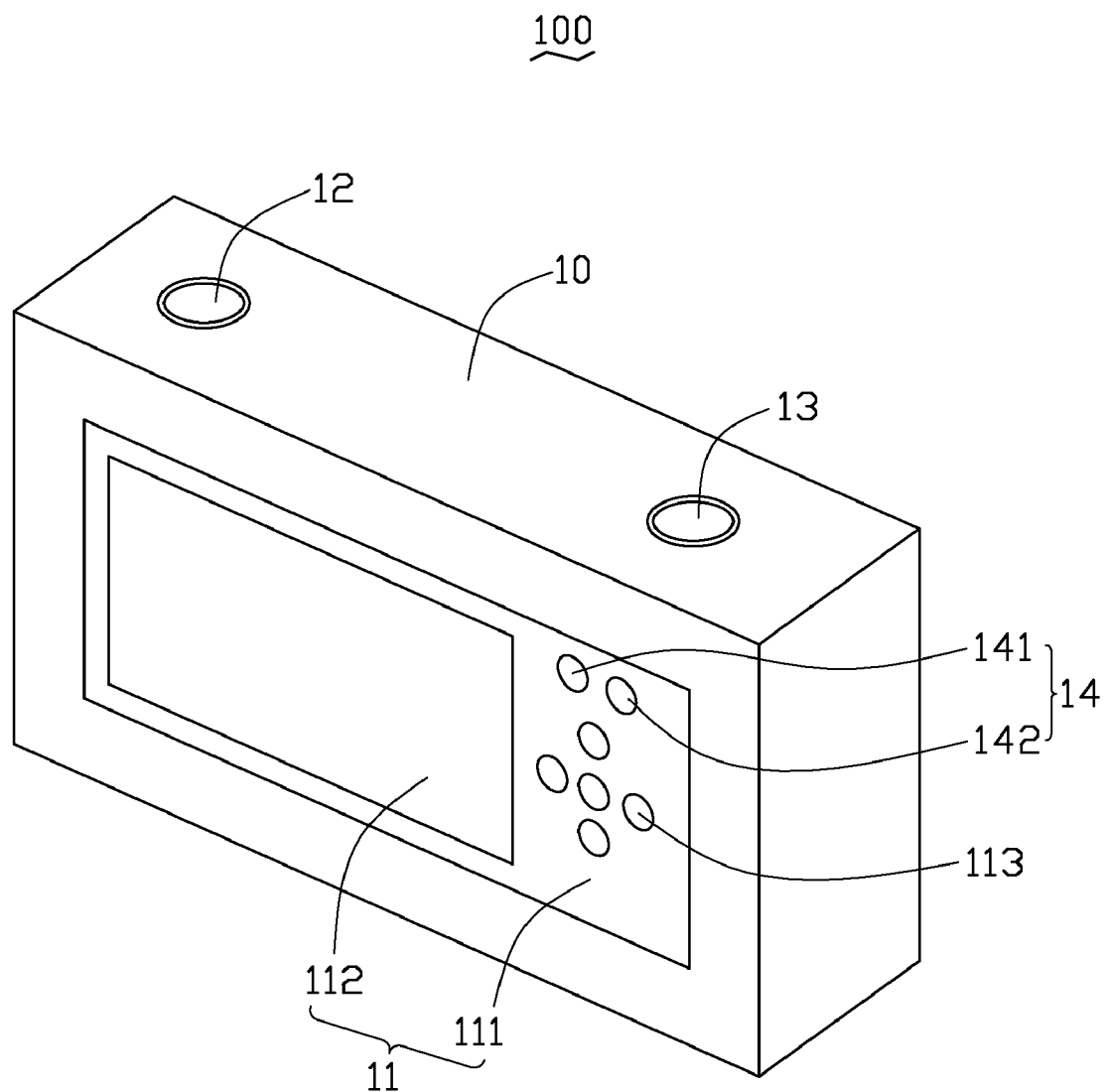
FIG. 4 is an isometric view of the digital camera of FIG. 1 when a right shutter button is activated.

The touch screen 11 has an image-displaying area 111 and a virtual button area 112. It should be noted that a "touch" on a typical touch screen means that the touch screen 11 senses the location of the touch of an object such as a tip of a finger or another object, for example a stylus on an active surface area of the touch screen 11. The image-displaying area 111 is configured for displaying all kinds of information, such as, images captured by a camera module (not shown) held in the housing 10, some control signals, status of the digital camera 100, or the like. The virtual button area 112 includes a plurality of virtual buttons 113, such as a scroll up virtual button, a scroll down virtual button, a delete virtual button and a back virtual button, and so on for controlling the digital camera 100. Understandably, these virtual buttons 113 may be activated when touched. Relative positions of the image-displaying area 111 and the virtual button area 112 can be exchanged according to which of the left and right shutter buttons 12, 13 is activated. When the left shutter button 12 is activated, as shown in FIG. 1, the virtual button area 112 is located at a left side of the touch screen 11 for allowing convenient left-handed operation of the digital camera 100. At this time, the image-displaying area 111 is located at a right side of the touch screen 11. Alternatively, when the right shutter button 13 is activated, as shown in FIG. 4, the virtual button area 112 is located at the right side. It may be understandable that the CPU 105 carries out the exchange of position of the image-displaying area 111 and the virtual button area 112 in response to the setting of the selection button to left- or right-button operation.

The left and right shutter buttons 12, 13 are electronically connected to a shutter of the lens assembly 15. The left shutter button 12 is convenient for left-handed users to operate the digital camera 100 and the right shutter button 13 is convenient for right-handed users to operate. It should be noted that when the left shutter button 12 is selected for use, the right shutter button 13 is deactivated. However, in another embodiment, some other function may be assigned to the right shutter button 13 instead of deactivating the right shutter buttons 13, and likewise for the left shutter button 12 when it is not activated, e.g. when the right shutter button 13 is activated.

The selection switch 14 in the exemplary embodiment includes electronic virtual buttons and is disposed in the virtual button area 112 of the touch screen 11. The selection switch 14 includes a left-handed operation button 141 and a right-handed operation button 142. The left-handed operation button 141 is electronically connected to the left shutter button 12 for starting the left shutter button 12. When the left-handed operation button 141 is activated, the left shutter button 12 is started and the virtual button area 112 is nearer the left side of the touch screen 11 for the left-handed users to operate buttons therein. Understandably, when the right-handed operation button 142 is activated, the right shutter button 13 is started and the virtual button area 112 is nearer the right side of the touch screen 11 for the right-handed users to operate buttons therein.

The shutter function of the lens assembly 15 is configured for exposing an image pickup device, such as a CCD image sensor, a CMOS image sensor, or the like, to capture an image.

As described above, the selection switch 14 may select one of the left shutter button 12 and the right shutter button 13 as desired by a user for left-handed or right-handed operation of the digital camera 100. The relative positions of the image-displaying area 111 and the virtual button area 112 are exchanged corresponding to which of the left or right shutter buttons 12, 13 is activated.

Figure 5:
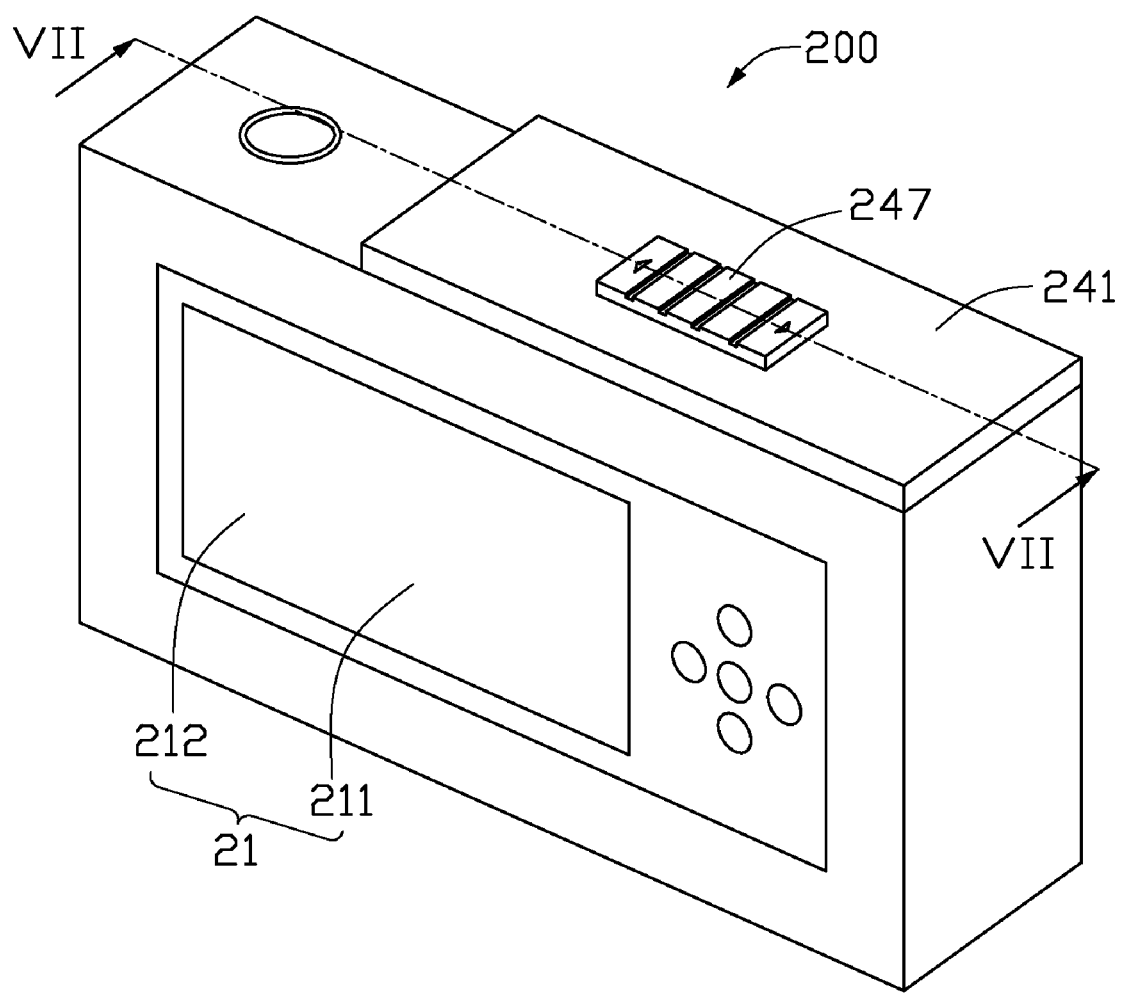
FIG. 5 is an isometric view of a digital camera including a slider portion of a selection switch according to a second embodiment.
Figure 6:
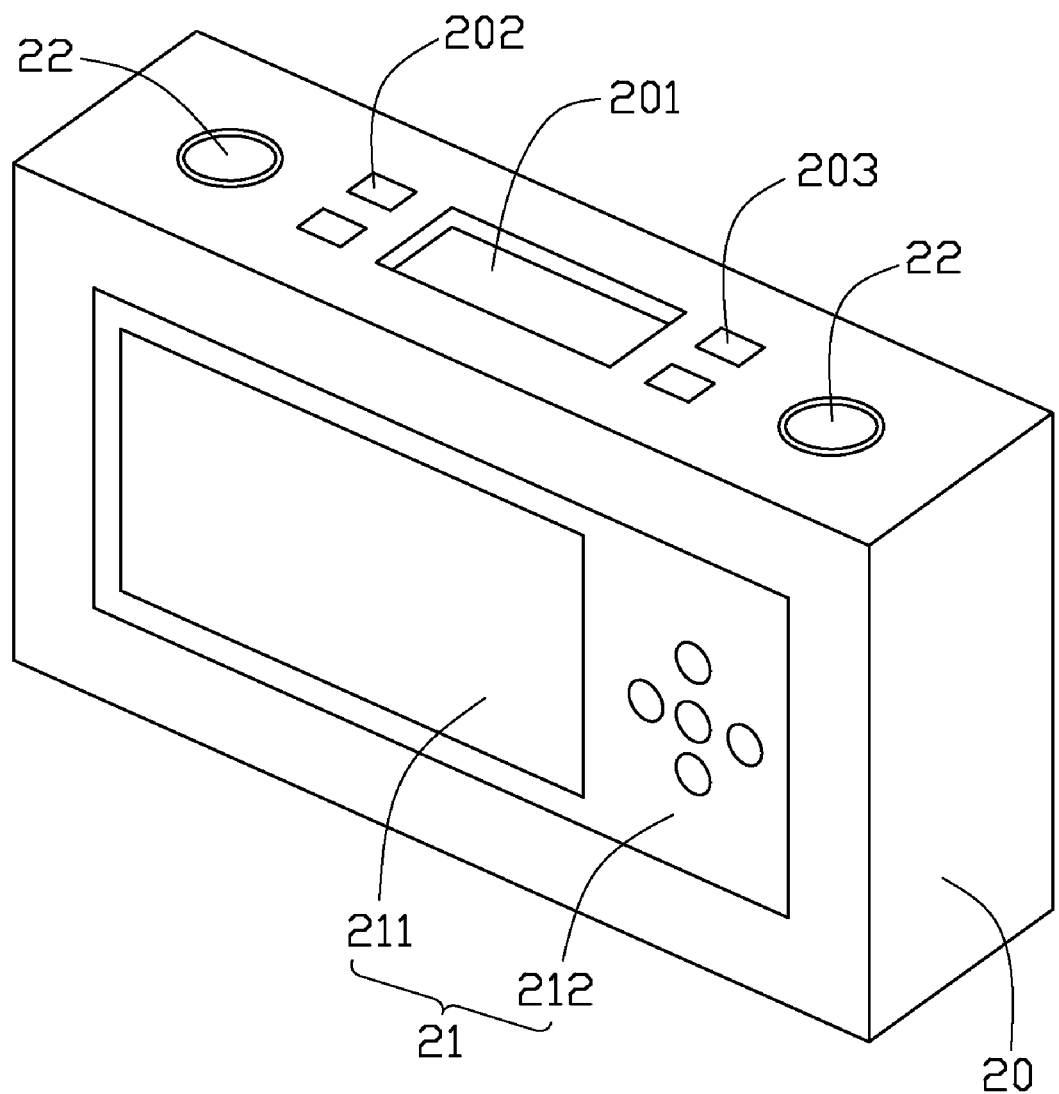
FIG. 6 is an isometric view of the digital camera of FIG. 5, without the slider portion.
Figure 7:
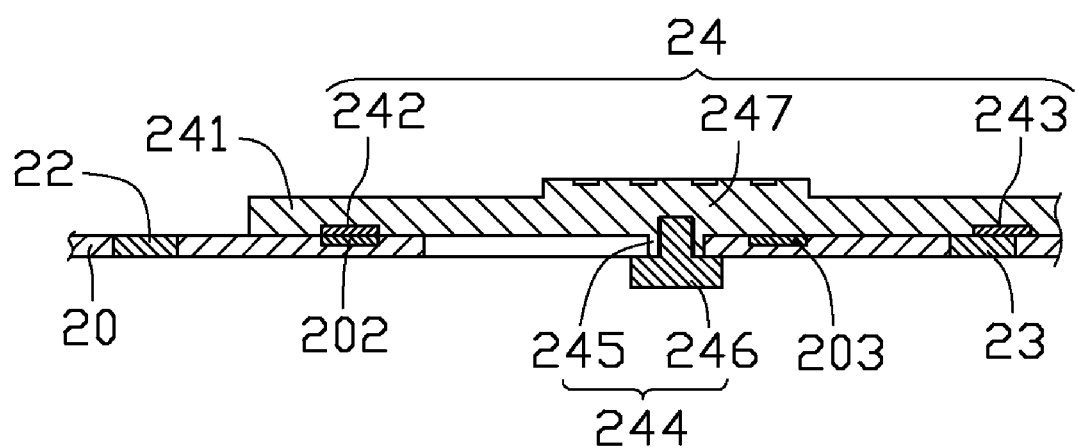
FIG. 7 is a partial, cross-sectional view of the selection switch and a housing of the digital camera of FIG. 5 along the line VII-VII.

Referring to FIGS. 5-7, a digital camera 200 according to a second embodiment is shown. Similar to the digital camera 100, the digital camera 200 includes a housing 20, a touch screen 21 received in the housing 20, a left shutter button 22 disposed on the housing 20, a right shutter button 23 disposed on the housing 20, a selection switch 24 and a lens assembly held in the housing 20.

A difference between the digital camera 100 and the digital camera 200 is that the selection switch 24 is a mechanical switch and includes an elongated slider 241, a first contact 242, a second contact 243, and a bolt 244 screwed to the elongated slider 241. The bolt 244 is configured for connecting the elongated slider 241 to the housing 20, and includes a head 245 and a threaded shaft 246 integrally formed with the head 245. The first and second contacts 242, 243 are made of metallic material and configured for turning on an exposure circuit 102 corresponding to the left shutter button 22 and the right shutter button 23. The first and second contacts 242, 243 are disposed on the housing 20 and are respectively located at two opposite sides of the bolt 244.

It may be appreciated that the selection switch 24 further includes a protruding block 247 for conveniently pushing the elongated slider 241 to move. The protruding block 247 is disposed on an opposite side of the elongated slider 241 to that on which the first and second contacts 242, 243 is mounted. The protruding block 247 is integrally formed with the elongated slider 241 in the second embodiment. Understandably, the protruding block 247 may be connected to the elongated slider 241 via other conventional methods, such as a threaded shaft, a weld, or the like.

The housing 20 includes an elongated through opening 201 functioning as a passage of the threaded shaft 246, a first joint 202 corresponding to the first contact 242, and a second joint 203 corresponding to the second contact 243. The through opening 201 has a small dimension than that of the head 245 of the bolt 244 for preventing the head 245 from escaping therefrom, and has a greater dimension than that of the threaded shaft 246 of the bolt 244 for letting the threaded shaft 246 move therein. The first and second joints 202, 203 are disposed on the housing 20 and are respectively located at two opposite sides of the through opening 201. The first joint 202 is electronically connected to the left shutter button 22, and the second joint 203 is electronically connected to the right shutter button 23. When the elongated slider 241 slides toward a left side of the housing 20, the first contact 242 contacts the first joint 202, and so, the left shutter button 22 is activated, so that the left-handed users can operate the digital camera 200 conveniently. Understandably, when the first contact 243 contacts the second joint 203, the right shutter button 23 is activated and the left shutter button 22 is turned off, so that the right-handed users can operate the digital camera 200 conveniently.

Similar to the first embodiment, the touch screen 21 includes an image-displaying area 211 and a virtual button area 212. Relative positions of the image-displaying area 211 and the virtual button area 212 are exchanged in response to activation of the left shutter button 22 and the right shutter button 23 in order to operate conveniently the digital camera 200, such as setting up parameters of the digital camera 200.

It should be understood that the above-described embodiments are intended to illustrate rather than limit the invention. Variations may be made to the embodiments without departing from the spirit of the invention. Accordingly, it is appropriate that the appended claims be construed broadly and in a manner consistent with the scope of the invention.

What is claimed is:

1. A digital camera having a housing and a lens assembly in the housing, the digital camera comprising:
   a touch screen in the housing comprising an image-displaying area and a virtual button area having a plurality of virtual buttons for controlling the digital camera;
   a right shutter button configured for right-handed activation of a shutter function of the lens assembly of the digital camera;
   a left shutter button configured for left-handed activation of the shutter function of the lens assembly of the digital camera; and
   a selection switch comprising:
      a left-handed operation button and a right-handed operation button disposed on the virtual button area of the touch screen, the left-handed operation button electronically connected to the left shutter button and configured for starting the left shutter button, the right-handed operation button electronically connected to the right shutter button and configured for starting the right shutter button, and a selected one of the left-handed and right-handed operation buttons for activating one of the left and right shutter buttons and changing a relative position of the image-displaying area and the virtual button area according to the selection of the left shutter button and the right shutter button; and
      an elongated slider, a first contact, a second contact, and a bolt connected to the elongated slider, the first and second contacts being mounted on two opposite sides of the elongated slider relative to the bolt, the bolt comprising a head and a threaded shaft connected to the head, the housing comprising an elongated through opening, and first and second joints respectively mounted on the two opposite sides of the housing relative to the elongated through opening corresponding to the first and second contacts, the elongated through opening being smaller than the head but larger than the threaded shaft.

2. The digital camera as claimed in claim 1, wherein the virtual button area comprises a plurality of virtual buttons.

3. The digital camera as claimed in claim 1, wherein the selection switch is an electronic switch.

4. The digital camera as claimed in claim 1, wherein the selection switch is a mechanical switch.

5. The digital camera as claimed in claim 1, wherein the selection switch further includes a protruding block disposed on an opposite side of the elongated slider from the location of the first and second contacts.

6. The digital camera as claimed in claim 5, wherein the protruding block is integrally formed with the elongated slider.

7. A digital camera having a housing and a lens assembly in the housing, the digital camera comprising:
- a touch screen in the housing comprising an image-displaying area and a virtual button area having a plurality of virtual buttons for controlling the digital camera;
- a right shutter button configured for right-handed activation of a shutter function of the lens assembly of the digital camera;
- a left shutter button configured for left-handed activation of the shutter function of the lens assembly of the digital camera; and
- a selection switch comprising an elongated slider, a first contact, a second contact, and a bolt connected to the elongated slider, the first and second contacts being mounted on two opposite sides of the elongated slider relative to the bolt, the bolt comprising a head and a threaded shaft connected to the head, the housing comprising an elongated through opening, and first and second joints respectively mounted on the two opposite sides of the housing relative to the elongated through opening corresponding to the first and second contacts, the elongated through opening being smaller than the head but larger than the threaded shaft, the selection switch electronically connected to the touch screen and a selected one of the left and right shutter buttons for activating one of the left and right shutter buttons and changing a relative position of the image-displaying area and the virtual button area according to the selection of the left shutter button and the right shutter button.

8. The digital camera as claimed in claim 7, wherein the selection switch further comprises a protruding block disposed on an opposite side of the elongated slider from the location of the first and second contacts.

9. The digital camera as claimed in claim 8, wherein the protruding block is integrally formed with the elongated slider.

* * * * *